United States Patent
Donkers et al.

(10) Patent No.: US 10,827,347 B1
(45) Date of Patent: Nov. 3, 2020

(54) DYNAMIC IDENTITIES IN A MOBILE DEVICE

(71) Applicant: ARMA Instruments AG, Baar (CH)

(72) Inventors: Pim Franciscus Hubertus Donkers, Tilburg (NL); Andrii Loginov, London (GB); Alexey Smirnov, Varna (BG)

(73) Assignee: ARMA Instruments AG (CH)

( * ) Notice: Subject to any disclaimer, the term of this patent is extended or adjusted under 35 U.S.C. 154(b) by 0 days.

(21) Appl. No.: 16/727,409

(22) Filed: Dec. 26, 2019

Related U.S. Application Data (62) Division of application No. 16/433,768, filed on Jun. 6, 2019, now Pat. No. 10,567,951.

(51) Int. Cl.
*H04W 8/18* (2009.01)
*H04W 12/06* (2009.01)

(52) U.S. Cl.
CPC ............ *H04W 8/18* (2013.01); *H04W 12/06* (2013.01)

(58) Field of Classification Search
CPC ................................ H04W 8/18; H04W 12/06
See application file for complete search history.

(56) References Cited

U.S. PATENT DOCUMENTS

| | | | |
|---|---|---|---|
| 8,229,394 B2 | 7/2012 | Karlberg | |
| 9,332,419 B2 | 5/2016 | Nadgir | |
| 10,104,710 B1 | 10/2018 | Hodge | |
| 2009/0227274 A1* | 9/2009 | Adler | .................. H04L 63/0272 455/466 |
| 2010/0311444 A1* | 12/2010 | Shi | .................. H04W 4/50 455/466 |
| 2012/0190354 A1* | 7/2012 | Merrien | .................. H04W 8/22 455/422.1 |
| 2012/0214439 A1 | 8/2012 | Yuan | |
| 2018/0159869 A1* | 6/2018 | Cordoba Lefler | .. H04L 63/1416 |
| 2019/0289460 A1* | 9/2019 | Piscopo, Jr. | ............ H04W 8/26 |

FOREIGN PATENT DOCUMENTS

EP             2461549 B1      11/2015

OTHER PUBLICATIONS

3GPP Technical Specification TS 23.002 'Network Architecture'; Version 15.0; released Mar. 2018.

\* cited by examiner

*Primary Examiner* — Nizar N Sivji
(74) *Attorney, Agent, or Firm* — Mendelsohn Dunleavy, P.C.

(57) ABSTRACT

A mobile device (1) is configured to receive a plurality of identity profiles from a server system (11), store the plurality of identity profiles in a storage means (7), select a first identity profile from the plurality of identity profiles, and transmit authentication information to a mobile communication network (21,22,25) in order to use the mobile communication network. The authentication information comprises an identifier from the first identity profile. The mobile device is further configured to detect an identity change event, select a second identity profile from the plurality of identity profiles upon detecting the identity change event, and transmit further authentication information to the mobile communication network or to a further mobile communication network (23,26). The further authentication information comprises an identifier from the second identity profile.

9 Claims, 7 Drawing Sheets

DYNAMIC IDENTITIES IN A MOBILE DEVICE

FIELD OF THE INVENTION

The invention relates to a mobile device for selecting an identity profile for use with a mobile communication network and a server system for enabling selection of such an identity profile.

The invention further relates to a computer-implemented method of selecting an identity profile and a computer-implemented method of enabling selection of an identity profile.

The invention also relates to a computer program product enabling a computer system to perform such methods.

BACKGROUND OF THE INVENTION

Building and maintaining a mobile communication network is not cheap and for this reason, users need to pay when they want to use a mobile communication network. Authentication in mobile networks is mandatory due to business and legal reasons, as well standards compliance. In order to verify that a user is authorized to use a mobile communication network, the user needs to transmit authentication information to the mobile communication network and this authentication information needs to comprise an identity. This identity may also be used for accounting purposes, e.g. if the user needs to pay per minute of calling and/or per MB of data usage.

In mobile communication networks such as GSM, UMTS and LTE, the identity that is transmitted in the authentication information is typically a user identity, e.g. an International Mobile Subscriber Identity (IMSI). In GSM, UMTS and LTE networks, the IMSI is provisioned in a Subscriber Identity Module (SIM) card. A drawback of the requirement to transmit this user identity is that it makes it easier to locate and track a user. Protocols used to authenticate the mobile network subscriber may address privacy issues to protect its identity from a passive eavesdropping over the radio network; however, the measures implemented this way have proven to be insufficient in a case when an adversary is capable of active signal interception (man in the middle attacks), and completely keep out of the scope threats from attackers that have access to the mobile network operator's equipment.

Most mobile phones use a single SIM card, but there are also certain models of mobile phones that are able to use two SIM cards. A mobile phone that is able to use two SIM cards is disclosed in EP 2 461 549 A1, for example. The benefit of using two SIM cards is that costs can be charged to a user's company for work calls and to the user himself for personal calls. However, even with two SIM cards, the user is relatively easy to locate and track, and the device's identification (IMEI number) remains persistent for each SIM card.

SUMMARY OF THE INVENTION

It is a first object of the invention to provide a mobile device, which helps protect the identity of the mobile device and/or its user(s).

It is a second object of the invention to provide a server system, which helps protect the identity of mobile devices and/or its users.

It is a third object of the invention to provide computer-implemented methods, which help protect the identity of a mobile device and/or its user(s).

In a first aspect of the invention, a mobile device comprises at least one receiver, at least one transmitter, storage means, and at least one processor configured to use said at least one receiver to receive a plurality of identity profiles from a server system, store said plurality of identity profiles in said storage means, select a first identity profile from said plurality of identity profiles, use said at least one transmitter to transmit authentication information to a mobile communication network in order to use said mobile communication network, said authentication information comprising an identifier from said first identity profile, detect an identity change event, select a second identity profile from said plurality of identity profiles upon detecting said identity change event, and use said at least one transmitter to transmit further authentication information to said mobile communication network or to a further mobile communication network, said further authentication information comprising an identifier from said second identity profile.

By obtaining identities from a server system, the mobile device is able to obtain as many identities as it needs to switch identities frequently and thereby protect the identity of the mobile device and/or its user(s).

Said at least one processor may be configured to use said at least one transmitter to transmit a message to said server system, said message identifying at least said first identity profile and indicating that said mobile device has finished using said first identity profile. This allows an identity used by a first mobile device to be used by other mobile devices and thereby both reduces the amount of identities that the server system needs to possess and optimizes the identity protection. The message is normally transmitted to the server system via a mobile communication network. Use of a phrase "X transmits to Y" does not imply that X transmits directly (via the physical layer) to Y or imply anything about the OSI layer(s) over which X and Y communicate.

Said at least one processor may be configured to detect said identity change event automatically without a user selecting another identity. If the user would need to manually select another identity, he would likely not do this often enough and/or not at the right moments.

Said at least one processor may be configured to detect said identity change event upon detecting a link failure and/or upon receiving a request or command to select a different cell of said mobile communication network. This prevents the collection of travel velocity intelligence and these moments are therefore the best moments to switch identities for identity protection. Alternatively or additionally, an identity change event may be detected automatically at regular or irregular intervals, e.g. upon expiry of a timer.

Said at least one processor may be configured to transmit said further authentication information to said further mobile communication network. By transmitting the further authentication to a different mobile communication network, network authentication event correlation may be prevented, and this may help defeat coarse geospatial targeting.

Said at least one processor may be configured to use said at least one transmitter to select a new cell on said mobile communication network or said further mobile communication network before transmitting said further authentication information to said new cell, said new cell being arbitrarily being selected from a plurality of cells. Normally, the closest cell tower would be used, but by regularly using a farther away cell tower, location pinpointing may be prevented, and this may help defeat coarse geospatial targeting.

Said at least one processor may be configured to prevent communication with more than one cell at the same time. This prevents cell tower triangulation on 2G networks.

Said at least one processor may be configured not to transmit a detach request to said mobile communication network upon detecting said identity change and/or to pause upon detecting said identity change event before transmitting said further authentication information to said mobile communication network or said further mobile communication network. This ensures temporal correlation distortion, the former via overlapping network authentication events and the latter via delayed network authentication events.

Said at least one processor may be configured to mark, in said storage means, said first identity profile as unusable upon detecting said identity change and use said at least one transmitter to transmit a request for new identity profiles to said server system upon determining that a quantity of usable identity profiles in said storage means is smaller than a predefined threshold. Although it would be possible obtain a new identity profile after each identity switch, the amount of communication with the server system is reduced when new identity profiles are only obtained if the quantity of unused/usable identity profiles becomes small.

In a second aspect of invention, a server system comprises at least one receiver, at least one transmitter, storage means for storing a collection of identity profiles and at least one processor configured to retrieve a plurality of said collection of identity profiles from said storage means, each of said plurality of identity profiles comprising an identifier of a user of a mobile communication network and/or a unique device identifier and each of said plurality of identity profiles not being marked, in said storage means, as in use, use said at least one transmitter to transmit said plurality of identity profiles to a mobile device, mark, in said storage means, said plurality of identity profiles as in use, use said at least one receiver to receive a message from said mobile device, said message identifying at least one of said plurality of identity profiles, and mark, in said storage means, said at least one identity profile identified in said message as not being in use.

By marking the transmitted identity profiles as in-use in the storage means, it is ensured that a single identity is not used by multiple mobile devices at the same time. By marking an identity profile as not being in use when a mobile device has finished using it, an identity used by a first mobile device may be used by other mobile devices. This both reduces the amount of identities that the server system needs to possess and optimizes the identity protection.

Said at least one processor may be configured to associate, in said storage means, a last-used time with said at least one identity profile identified in said message upon receiving said message and when one or more of said plurality of identity profiles are associated with a last-used time, a difference between a current time when said one or more identity profiles are retrieved and each of said one or more last-used times exceeds a predetermined threshold. By ensuring that a single identity is not used by two different mobile devices soon after each other, the trigger of a fraud management system may be avoided. The predetermined threshold may be 24 hours, for example.

Said identifier of said user of said mobile communication network may comprise an International Mobile Subscriber Identity and/or said unique device identifier may comprise an International Mobile Equipment Identity.

In a third aspect of the invention, a computer-implemented method of selecting an identity profile comprises receiving a plurality of identity profiles from a server system, storing said plurality of identity profiles in a storage means, selecting a first identity profile from said plurality of identity profiles, transmitting authentication information to a mobile communication network in order to use said mobile communication network, said authentication information comprising an identifier from said first identity profile, detecting an identity change event, selecting a second identity profile from said plurality of identity profiles upon detecting said identity change event, and transmitting further authentication information to said mobile communication network or to a further mobile communication network, said further authentication information comprising an identifier from said second identity profile. Said method may be performed by software running on a programmable device. This software may be provided as a computer program product.

In a fourth aspect of the invention, a computer-implemented method of enabling selection of an identity profile comprises retrieving a plurality of said collection of identity profiles from a storage means, each of said plurality of identity profiles comprising an identifier of a user of a mobile communication network and/or a unique device identifier and each of said plurality of identity profiles not being marked, in said storage means, as in use, transmitting said plurality of identity profiles to a mobile device, marking, in said storage means, said plurality of identity profiles as in use, receiving a message from said mobile device, said message identifying at least one of said plurality of identity profiles, and marking, in said storage means, said at least one identity profile identified in said message as not being in use. Said method may be performed by software running on a programmable device. This software may be provided as a computer program product.

In a fifth aspect of the invention, a mobile device comprises at least one receiver, at least one transmitter, storage means, and at least one processor configured to select a first identity profile from a plurality of identity profiles stored in said storage means, use said at least one transmitter to transmit authentication information to a mobile communication network in order to use said mobile communication network, said authentication information comprising an identifier from said first identity profile, detect an identity change event automatically without a user selecting another identity, select a second identity profile from said plurality of identity profiles upon detecting said identity change event, and use said at least one transmitter to transmit further authentication information to said mobile communication network or to a further mobile communication network, said further authentication information comprising an identifier from said second identity profile.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: receiving a plurality of identity profiles from a server system, storing said plurality of identity profiles in a storage means, selecting a first identity profile from said plurality of identity profiles, transmitting authentication information to a mobile communication network in order to use said mobile communication network, said authentication information comprising an identifier from said first identity profile, detecting an identity change event, selecting a second identity profile from said plurality of identity profiles upon detecting said identity change event, and transmitting further authentication information to said mobile communication network or to a further mobile communication network, said further authentication information comprising an identifier from said second identity profile.

A non-transitory computer-readable storage medium stores at least a second software code portion, the second software code portion, when executed or processed by a computer, being configured to perform executable operations comprising: retrieving a plurality of said collection of identity profiles from a storage means, each of said plurality of identity profiles comprising an identifier of a user of a mobile communication network and/or a unique device identifier and each of said plurality of identity profiles not being marked, in said storage means, as in use, transmitting said plurality of identity profiles to a mobile device, marking, in said storage means, said plurality of identity profiles as in use, receiving a message from said mobile device, said message identifying at least one of said plurality of identity profiles, and marking, in said storage means, said at least one identity profile identified in said message as not being in use.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
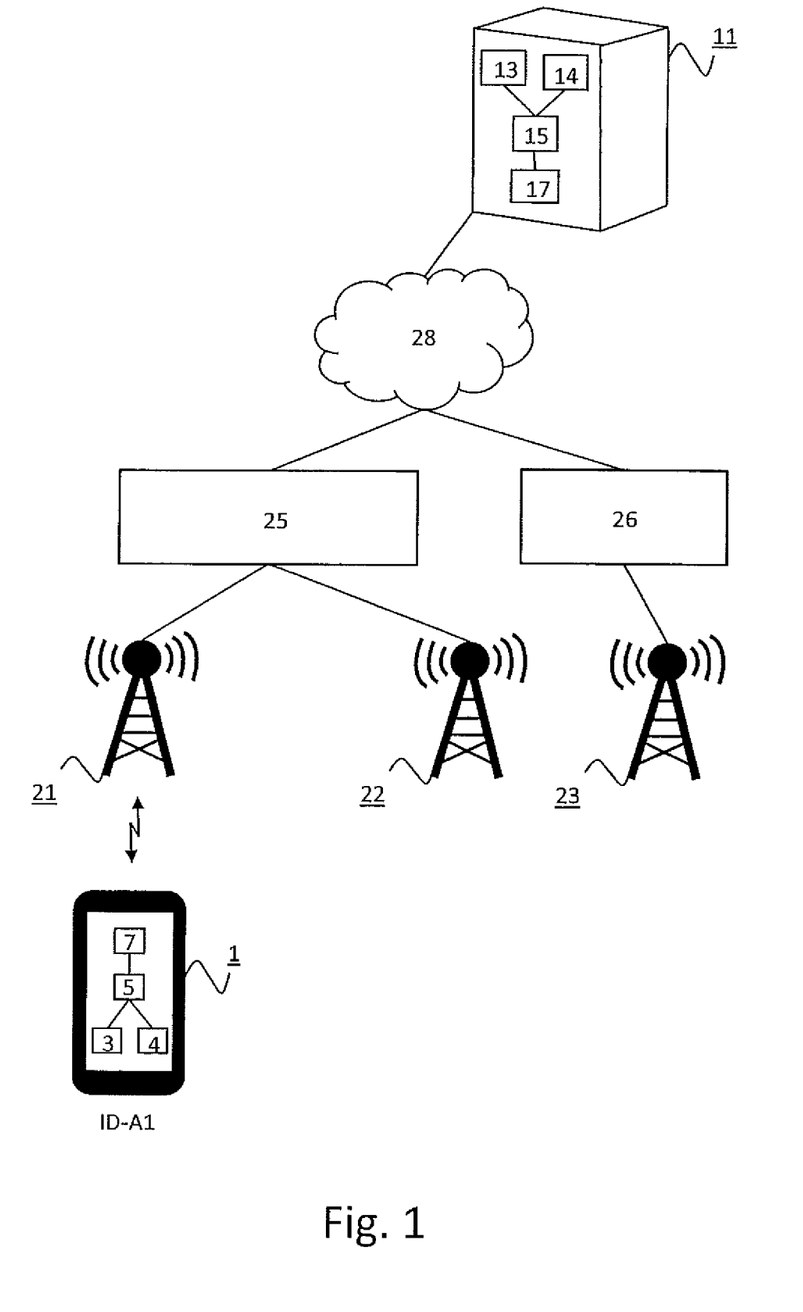
FIG. 1 is a block diagram of an embodiment of the mobile device and an embodiment of the server system.

FIG. 1 shows an embodiment of the server system, profile server system 11, an embodiment of the mobile device, mobile device 1, and two mobile communication networks. The server system 11 comprises a receiver 13, a transmitter 14, a processor 15 and storage means 17. The storage means 17 is used for storing a collection of identity profiles, amongst others.

The processor 15 is configured to retrieve a plurality of the collection of identity profiles from the storage means 17. Each of the plurality of identity profiles comprises an identifier of a user of a mobile communication network and/or a unique device identifier and each of the plurality of identity profiles is not marked, in the storage means 17, as in use.

The identifier of the user of the mobile communication network, if present, typically comprises an International Mobile Subscriber Identity (IMSI). The unique device identifier, if present, typically comprises an International Mobile Equipment Identity (IMEI). In its simplest form, the identity profile is an identifier, e.g. IMSI, but typically comprises multiple elements, e.g. multiple identifiers.

The processor 15 is further configured to use the transmitter 14 to transmit the plurality of identity profiles to the mobile device 1, and mark, in the storage means 17, the plurality of identity profiles as in use. The identity profiles are transmitted in encrypted form and are preferably stored in encrypted formed as well.

The processor 15 is also configured to use the receiver 13 to receive a message from the mobile device 1. The message identifies at least one of the plurality of identity profiles. The processor 15 is further configured to mark, in the storage means 17, the at least one identity profile identified in the message as not being in use.

The mobile device 1 comprises a receiver 3, a transmitter 4, a processor 5 and storage means 7. The processor 5 is configured to use the at receiver 3 to receive a plurality of identity profiles from the profile server system 11 and store the plurality of identity profiles in the storage means 7. The processor 5 is further configured to select a first identity profile from the plurality of identity profiles and use the transmitter 4 to transmit authentication information to a base station 21 of a mobile communication network in order to use the mobile communication network. The authentication information comprises an identifier from the first identity profile. In LTE, the authentication information is transmitted in the LTE Attach procedure, for example.

The processor 5 is further configured to detect an identity change event, select a second identity profile from the plurality of identity profiles upon detecting the identity change event, and use the transmitter 4 to transmit further authentication information to the base station 21 or a base station 22 of the mobile communication network or to a base station 23 of a further mobile communication network. The further authentication information comprises an identifier from the second identity profile.

The identity profiles from the collection are circulated among all mobile devices that use the identity protection service offered by the profile server system 11. Typically, when the mobile device 1 selects a new identity profile, it switches off its modem, changes the main profile to the new identity profile and switches on its modem again. After modem initialization, it activates to the new identity profile.

In the example of FIG. 1, the mobile communication network comprises the base stations 21 and 22 and a core network 25 and the further mobile communication network comprises the base station 23 and the core network 26. Both core networks 25 and 26 are connected to the Internet 28. The profile server system 11 is also connected to the Internet 28. The mobile device 1 needs to possess at least one identity profile in order to obtain new identity profiles from profile server system 11 via a mobile communication network. Such an identity profile may be pre-configured in the mobile device 1. Alternatively, the mobile device 1 may be able to obtain new identity profiles from profile server system 11 via a wireless LAN access point (now shown), for example.

In the embodiment of FIG. 1, the processor 5 of the mobile device 1 is configured to use the transmitter 4 to transmit a message to the profile server system 11 that identifies at least the first identity profile and indicates that the mobile device 1 has finished using the first identity profile. This allows the first identity profile to be re-used by other mobile devices.

In the embodiment of FIG. 1, the mobile device 1 returns multiple identity profiles to the profile server system 11 at the same time and requests new identity profiles in the same message with which the old ones are returned. In an alternative embodiment, an identity profile is returned as soon as the mobile device 1 has finished using it and/or one or more new identity profiles are requested in a separate message.

In the embodiment of FIG. 1, the mobile device 1 requests new identity profiles when the quantity of unused/available identity profiles in the storage means 7 falls below a specified threshold. This is to ensure that there are always enough available identity profiles. This threshold may have a value of between 10 and 30, for example.

In the embodiment of FIG. 1, the processor 5 is configured to detect the identity change event automatically without a user selecting another identity. In particular, the processor 5 is configured to detect the identity change event upon detecting a link failure (e.g. when moving through an area without connectivity like tunnels and underground parking garages) and/or upon receiving a request or command to select a different cell of the mobile communication network. The latter request or command is typically transmitted as part of a handover procedure.

In the embodiment of FIG. 1, the processor 5 is configured to select and start using the new identity profile as soon it detects the radio link failure, i.e. it does not attempt to re-establish the connection. Furthermore, the processor 5 is configured to ignore the (handover) request or command and the mobile device 1 does not complete a requested or commanded handover. In the embodiment of FIG. 1, the processor 5 is also configured to detect the identity change event automatically upon expiry of a (e.g. random) timer.

In the embodiment of FIG. 1, a proprietary JSON-based protocol is used by the mobile device 1 to obtain the identity profiles from the profile server system 11 and the messages exchanged between the mobile device 1 and the profile server system 11 are formed in JSON/XML format. In an alternative embodiment, a different protocol may alternatively or additionally be used. For example, an SM-DP compliant provisioning process may be used.

An example of a profile response format is shown below:

[{
"countrycode":"44",
"countryiso":"GB",
"countryname":"United Kingdom",
"errorcode":"0",
"errortext":"OK",
"imsi":"234158341040126",
"kc":" ",
"localformat":"07788 450450",
"mcc":"234",
"mnc":"15",
"msc":"44778",
"msisdn":"447788450450",
"operatorname":"Vodaf one",
"originalmcc":"234",
"originalmnc":"15",
"originaloperatorname":"Vodafone",
"plmn":"23415",
"ported":"false",
"reachable":"true",
"validnumber":"true"
}]

A description of the data fields contained in this example response format is given below:
countrycode: country code of number's home country
countryiso: ISO 3166 country code of number's home country
countryname: Name of number's home country
errorcode: an error number if any error, otherwise 0
errortext: a description of the error code (otherwise "OK")
imsi: the international mobile subscriber id of the subscriber
localformat: the number as it would be written in its home country
mcc: the mobile country code of the home network
mnc: the mobile network code of the home network
msisdn: the mobile number to which this query pertains
operatorname: the name of the home network operator
originalmcc: the mcc of the original operator (if ported)
originalmnc: the mnc of the original operator (if ported)
originaloperatorname: the name of the original operator (if ported)
plmn: plmn code of home network (mcc+mnc)
ported: whether the number has been ported (true/false)
reachable (meta): whether the number is in coverage and reachable (true/false/undetermined)
transactioncost: cost of this lookup in credits (e.g. 1.00)
validnumber: (meta) whether the number is a valid subscriber (true/false/undetermined)

Examples of client-based commands that the mobile device 1 may be able to transmit to profile server system 11 are IMSI allocation request, IMSI identity delete, IMSI check and IMSI network registration failure notification. The "IMSI allocation request" notifies the profile server system 11 that the mobile device 1 needs more identity profiles (e.g. IMSI/IMEI pairs), the "IMSI identity delete" message releases used identity profiles back to the pool/collection on the profile server system 11, "IMSI check" asks the profile server system 11 if it is really okay to use this identity profile now, and "IMSI network registration failure notification" tells the profile server system 11 that there was a problem. Examples of server-based commands that the profile server system 11 may be able to transmit to server mobile device 1 are IMSI allocation result, IMSI revoke and IMSI client check. These commands may be communicated using Tor onion service transport in JSON format, for example. The JSON messages may be encrypted and signed with private PKI keys. If a JSON message is signed with the correct key, an application on the mobile device 1 may validate the authenticity of the signature with its own signing key stored in a non-volatile secure part of the storage means 7. When key validity is confirmed, the mobile device 1 decrypts the JSON message.

The identity profiles in the collection/pool stored in the storage means 17 are normally pre-provisioned, i.e. no dynamic activation or provisioning needs to be performed by the mobile device 1. Typically, each profile in the collection/pool has a shared balance and no individual balances are tracked. As a result, the data subscription would be flat rate from the customer perspective.

In the embodiment shown in FIG. 1, the mobile device 1 comprises one processor 5. In an alternative embodiment, the mobile device 1 comprises multiple processors. The receiver 3 and the transmitter 4 of the mobile device 1 may use one or more cellular communication technologies such as GPRS, CDMA, UMTS, LTE, and/or 5G NR to communicate with the base stations 21-23, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver.

The processor 5 may be a general-purpose processor, e.g. an ARM or Qualcomm processor, or an application-specific processor. The processor 5 may run Google Android or Apple iOS as operating system or any other operating system or even multiple operating systems. The latter may be useful to satisfy additional security requirements regarding implementation of cryptographic and data protection functions. The storage means 7 may comprise one or more memory units. The storage means 7 may comprise solid state memory, for example. The mobile device 1 may comprise other components typical for a mobile device, e.g. a display and a battery. The mobile device 1 may comprise other software components and/or hardware components that are used to offer identity protection. The mobile device 1 may be a mobile phone or tablet, for example. The invention may be implemented using a computer program running on one or more processors.

In the embodiment shown in FIG. 1, the profile server system 11 comprises one processor 15. In an alternative embodiment, the profile server system 11 comprises multiple processors. The processor 15 of the profile server system 11 may be a general-purpose processor, e.g. an Intel or an AMD processor, or an application-specific processor, for example. The processor 15 may comprise multiple cores, for example. The processor 15 may run a Unix-based or Windows operating system, for example.

The receiver 13 and the transmitter 14 may use one or more communication technologies and protocols such as the Internet protocol to communicate with mobile device 1, for example. The profile server system 1 may be connected to the Internet, for example. The receiver 13 and the transmitter 14 may be combined in a transceiver. Profile server system 11 may comprise other components typical for a server system, e.g. a power supply. In the embodiment of FIG. 1, the profile server system 11 comprises a single device. In an alternative embodiment, the profile server system 11 comprises multiple devices. The invention may be implemented using a computer program running on one or more processors.

In the example of FIG. 1, the mobile device 1 is shown to be attached to the mobile communication network via the base station 21. As described, the mobile device will next be attached to the mobile communication network via the base station 21 or the base station 22 or attached to the further mobile communication network via the base station 23. When the mobile device 1 moves out of range of the base station 21, it will have to attach to one of base stations 22 and 23.

Figure 2:
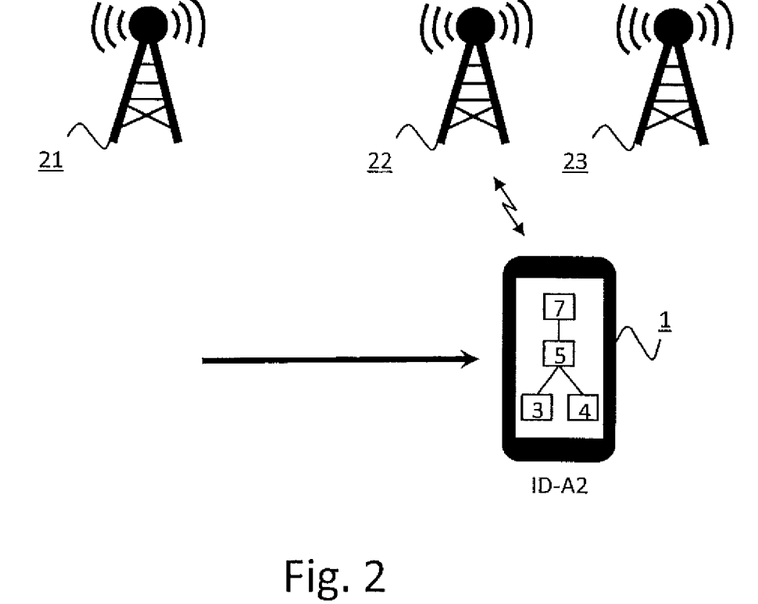
FIG. 2 depicts a first embodiment of the mobile device at a second moment.
Figure 3:
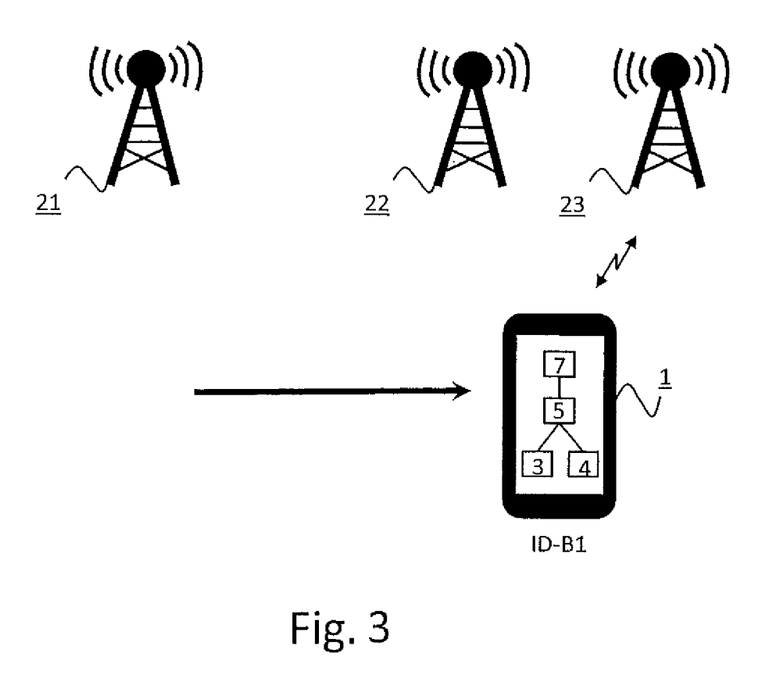
FIG. 3 depicts a second embodiment of the mobile device at a second moment.

FIG. 2 shows the mobile device 1 after having moved and shows the mobile device 1 being attached to the mobile communication network via base station 22. However, it is beneficial in this situation to attach to further mobile communication network instead, to help defeat coarse geospatial targeting. This is shown in FIG. 3. FIG. 3 shows the mobile device 1 after having moved and shows the mobile device 1 being attached to the further mobile communication network via base station 23. In the example of FIG. 3, the mobile device transmitted the further authentication information to the further mobile communication network.

In the examples of FIGS. 2 and 3, the mobile device 1 was able to choose from two cells before transmitting the further authentication information to the new cell. Instead of selecting the cell that is strongest or a cell belonging to a different mobile communication network (operator), one of the plurality of cells may be chosen arbitrarily to prevent location pinpointing. A mobile device may normally communicate with more than one cell at the same time, e.g. in a soft handover procedure. In the embodiment of FIGS. 1-3, the processor 5 is configured to prevent communication with more than one cell at the same time to prevent cell tower triangulation.

Figure 4:
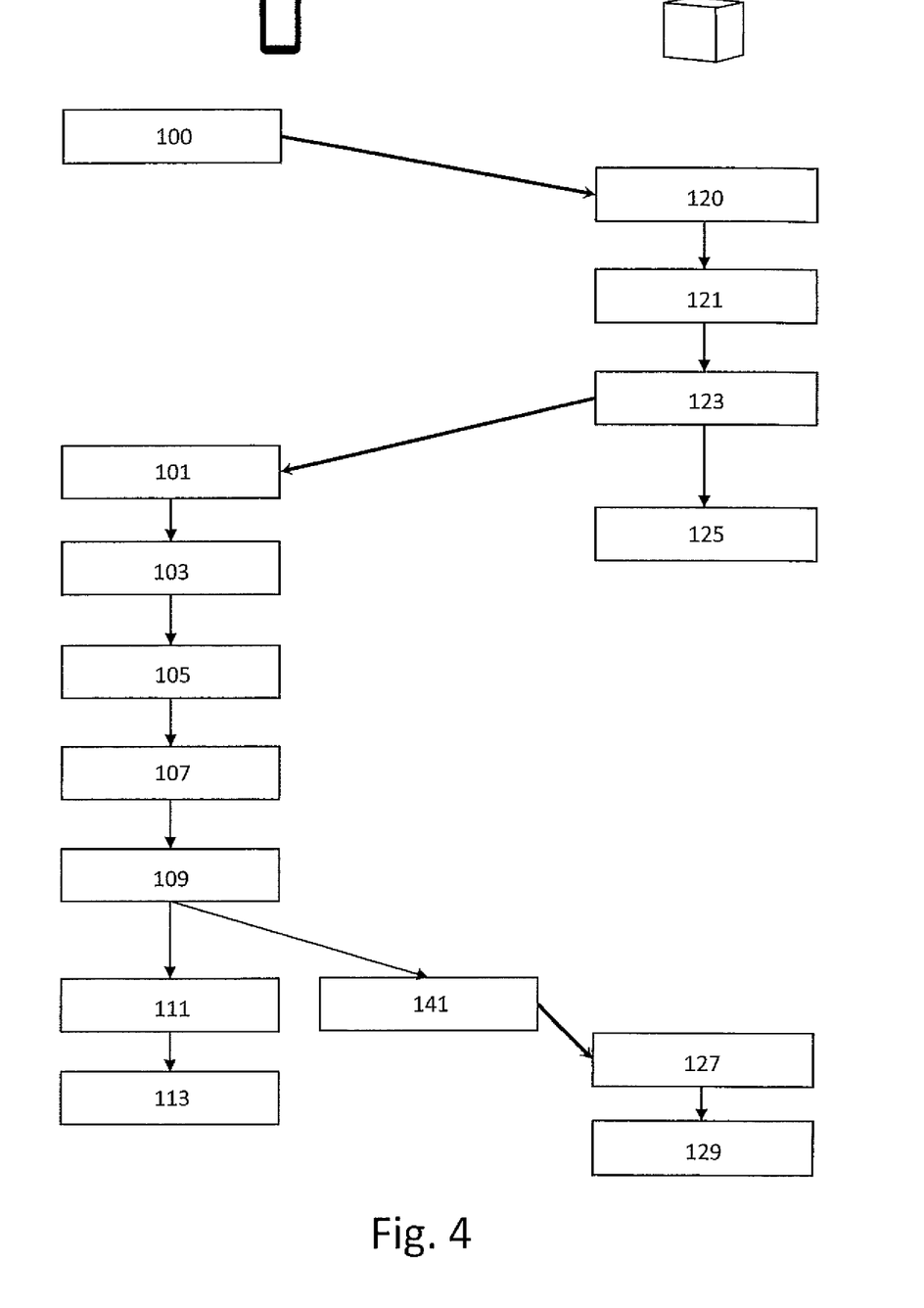
FIG. 4 is a flow diagram of a first embodiment of the methods.

A first embodiment of the computer-implemented methods of selecting, and enabling selection of, an identity profile is shown in FIG. 4. A step 100 comprises a mobile device transmitting a request for identity profiles to a profile server system. A step 120 comprises the profile server system receiving the request from the mobile device.

A step 121 comprises the profile server system retrieving a plurality of the collection of identity profiles from a storage means of the profile server system. Each of the plurality of identity profiles comprises an identifier of a user of a mobile communication network and/or a unique device identifier and each of the plurality of identity profiles is not marked, in the storage means, as in use. A step 123 comprises the profile server system transmitting the plurality of identity profiles to the mobile device. A step 125 comprises the profile server system marking, in the storage means, the plurality of identity profiles as in use.

A step 101 comprises the mobile device receiving the plurality of identity profiles from the profile server system. A step 103 comprises the mobile device storing the plurality of identity profiles in a storage means of the mobile device. A step 105 comprises the mobile device selecting a first identity profile from the plurality of identity profiles. A step 107 comprises the mobile device transmitting authentication information to a mobile communication network in order to use the mobile communication network. The authentication information comprises an identifier from the first identity profile.

A step 109 comprises the mobile device detecting an identity change event. A step 111 comprises the mobile device selecting a second identity profile from the plurality of identity profiles upon detecting the identity change event. A step 113 comprises the mobile device transmitting further authentication information to the mobile communication network or to a further mobile communication network. The further authentication information comprising an identifier from the second identity profile. Steps 111 and 113 are similar to steps 105 and 107, but a different identity profile is selected and different authentication information is therefore transmitted.

A step 141 is also performed upon detecting the identity change event. In the embodiment of FIG. 4, step 141 is performed after each identity change event. In an alternative embodiment, step 141 is only performed after a certain number of identity change events.

Step 141 comprises the mobile device transmitting a message to the profile server system. The message identifies the first identity profile and indicates that the mobile device has finished using the first identity profile. A step 127 comprises the profile server system receiving the message from the mobile device. A step 129 comprises the profile server system marking, in the storage means, the identity profile identified in the message as not being in use.

Figure 5:
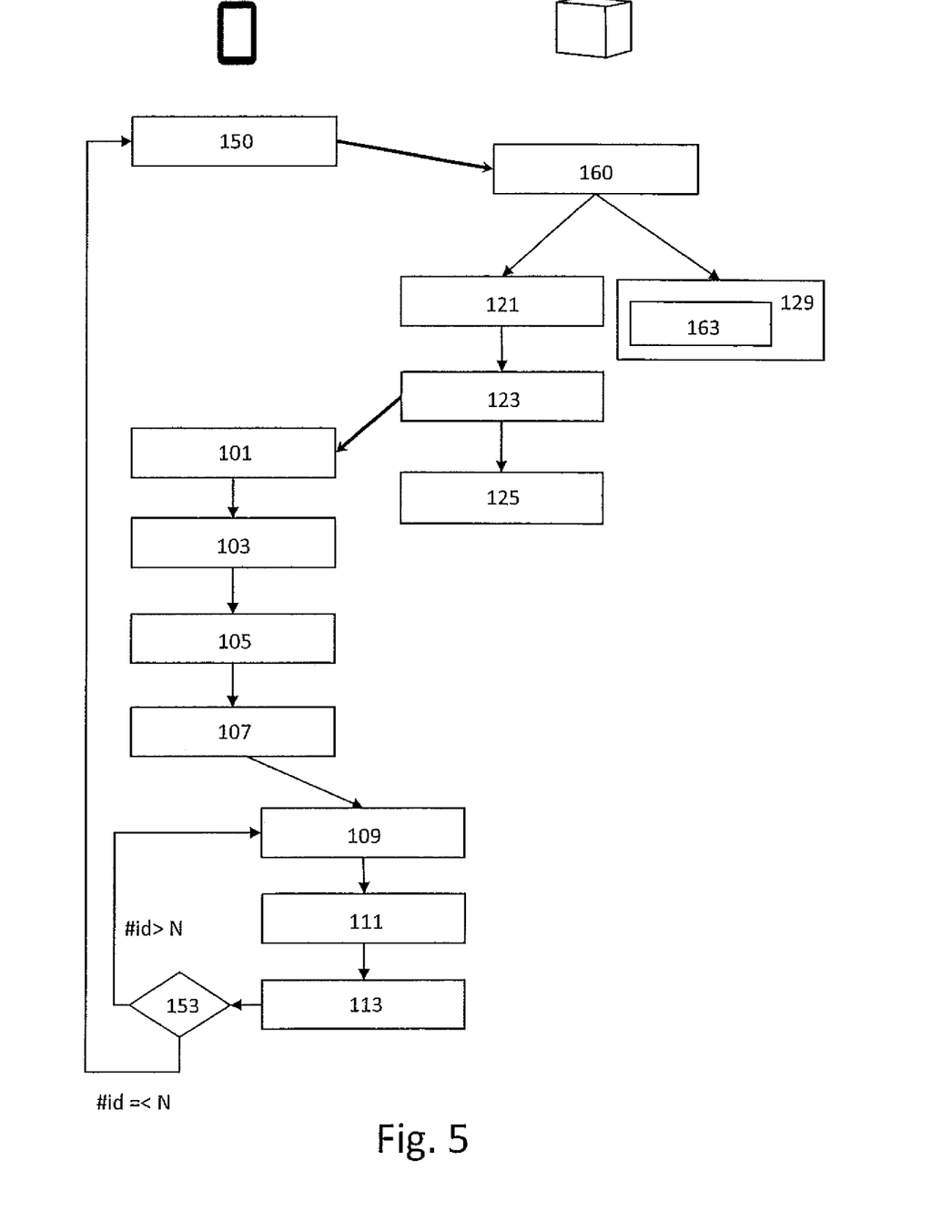
FIG. 5 is a flow diagram of a second embodiment of the methods.

A second embodiment of the computer-implemented methods of selecting, and enabling selection of, an identity profile is shown in FIG. 5. In the embodiment of FIG. 5, steps 100, 120, 127 and 141 of FIG. 4 have been replaced with steps 150 and 160. Steps 100 and 141 have been combined into step 150. Steps 120 and 127 have been combined into step 160.

Step 150 comprises a mobile device transmitting a message to the profile server system. The message comprises a request for identity profiles. If the mobile device has already used identity profiles, the message may also identify these identity profiles and indicate that the mobile device has finished using them. Step 160 comprises the server system receiving the request from the mobile device. Since step 160 is a combination of steps 120 and 127 of FIG. 4, both steps 121 and 129 are performed upon receipt of the message from the mobile device in step 160.

In the embodiment of FIG. 5, a step 153 is performed after step 113. In step 153, the mobile device checks whether the quantity of usable/available identities in the storage means of the mobile device is larger than a threshold N. If so, then step 109 is repeated. If not, then step 150 is repeated and the mobile device obtains new identity profiles from the profile server system.

In the embodiment of FIG. 5, step 129 comprises a sub step 163. Step 163 comprises the profile server system associating, in the storage means of the profile server system, a last-used time with the identity profiles identified in the message received in step 160. Furthermore, in step 121, the profile server system only retrieves identity profiles that are associated with a last-used time whose difference with the current time exceeds a predetermined threshold or which are not associated with a last-used time (i.e. have not been used yet).

The predetermined threshold is also referred to a cooldown time and this cooldown time may be 24 hours, for example. The cooldown time is used to avoid triggering of a fraud management system. The last-used time may be indicated in the message received in step 160 or the profile server system may use the time of receipt of the message in step 160 as the last-used time.

In an alternative embodiment, step 163 comprises associating a cooldown timer instead of a last-used time with the identity profiles identified in the message received in step 160. Step 125 is then performed upon expiry of the cooldown timer and not earlier. After the cooldown timer has expired, the identified identity profiles may be re-used.

Figure 6:
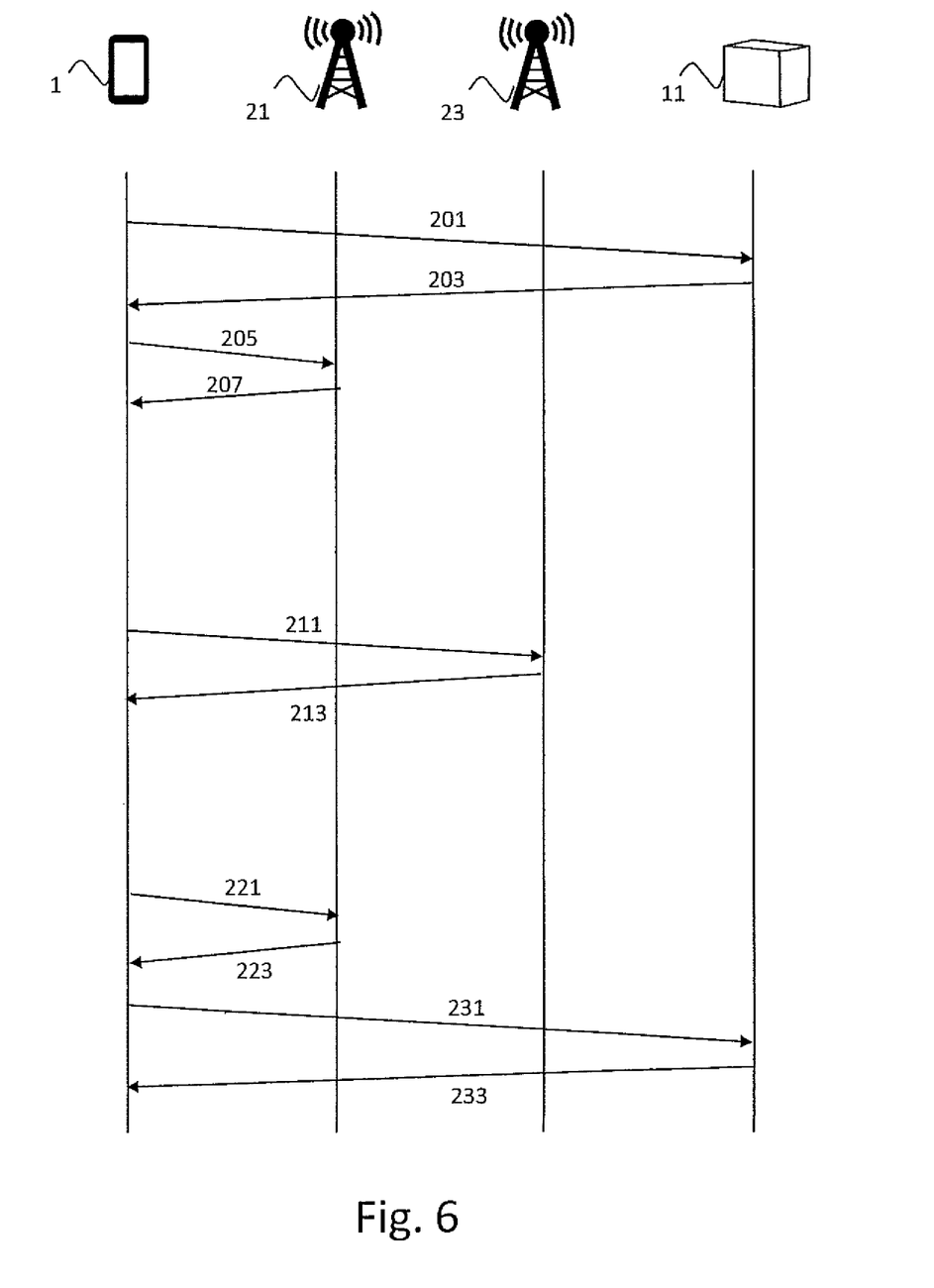
FIG. 6 depicts an example of transmission steps performed by the mobile device and server system of FIG. 1.
Figure 7:
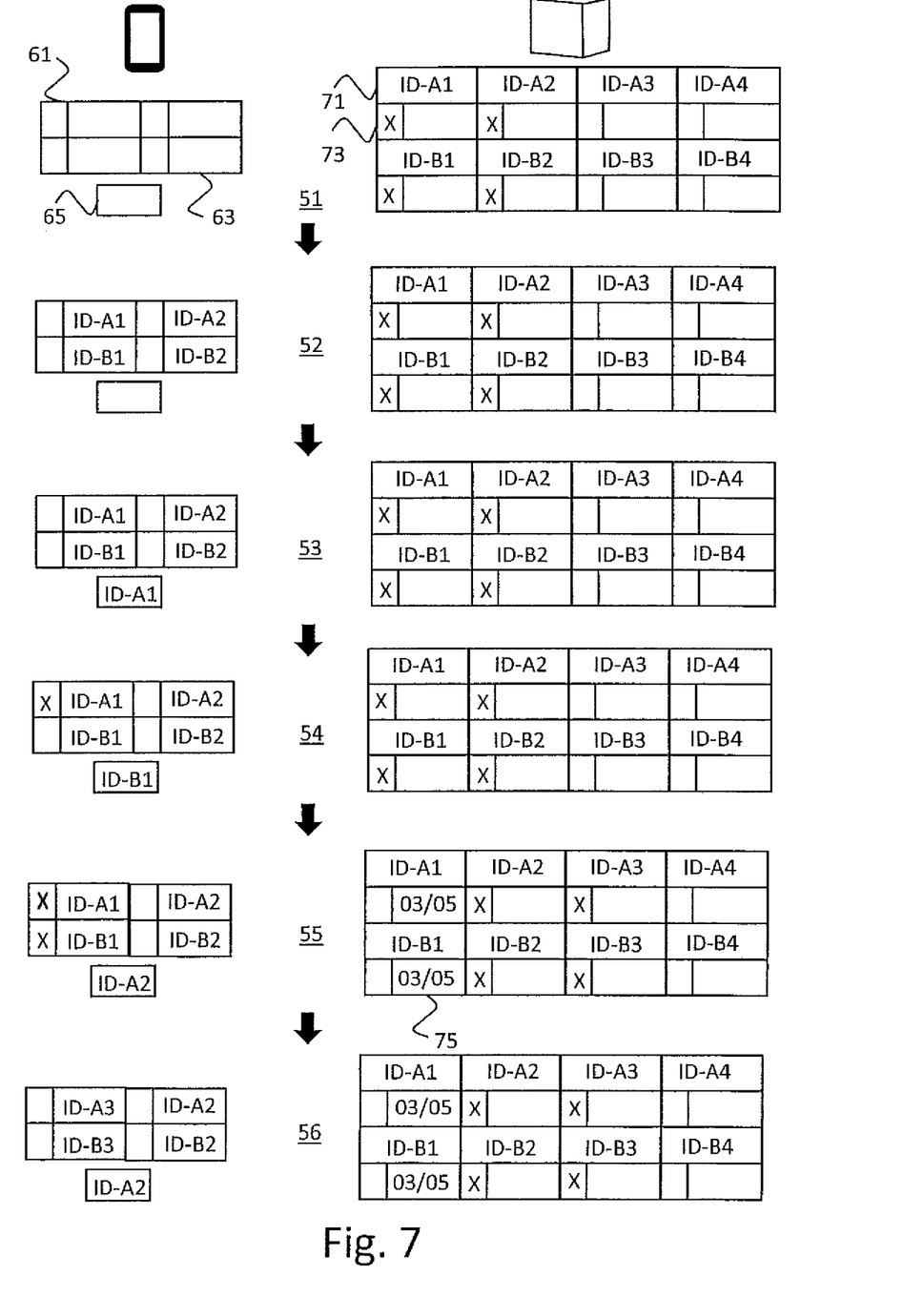
FIG. 7 shows identity profiles stored before and after the steps depicted in FIG. 6.

FIG. 6 depicts an example of the transmission steps performed by the mobile device 1 and the profile server system 11 of FIG. 1. FIG. 7 shows identity profiles stored before and after the transmission steps depicted in FIG. 6.

In step 201, the mobile device 1 transmits a request for identity profiles to profile server system 11, see also steps 150 and 160 of FIG. 5. After receipt of this message, the profile server system 11 retrieves four identity profiles from the storage means of the profile server system 11. These identity profiles each comprise an identifier 71 and a field indicating whether the identity profile is in use. After the profile server system 11 has retrieved the identity profiles with identifiers ID-A1, ID-A2, ID-B1 and ID-B2, it marks them as in use at moment 51.

In step 203, the profile server system 11 transmits the four retrieved identity profiles to the mobile device 1, see also steps 123 and 101 of FIG. 5. The mobile device 1 then stores these identity profiles, including their identifiers 63, in the storage means of the mobile device at moment 52.

At moment 53, the mobile device 1 selects the identity profile with the identifier ID-A1 from the stored identity profiles, as shown in field 65. In step 205, the mobile device 1 transmits authentication information to the base station 21 of the mobile communication network in order to use the mobile communication network, see also step 107 of FIG. 5. The authentication information comprises the identifier ID-A1. In step 207, the base station 21 transmits a response to the mobile device 1 confirming that the mobile device 1 has been authenticated.

At moment 54, upon detecting a first identity change event, the mobile device 1 selects a second identity profile with the identifier ID-B1 from the stored identity profiles and marks the used identity profile with the identifier ID-A1 as unusable in field 61. In step 211, the mobile device 1 transmits further authentication information to the base station 23 of the further mobile communication network, see also step 113 of FIG. 5. The further authentication information comprises the identifier ID-B1. In step 213, the base station 21 transmits a response to the mobile device 1 confirming that the mobile device 1 has been authenticated.

In the example of FIG. 6, the mobile device 1 does not transmit a detach request to the base station 23 upon detecting the identity change. The mobile device 11 may pause upon detecting the identity change event before performing step 211. The length of this pause is preferably chosen such that it does not cause any inconvenience due to temporary connectivity loss and may be less than one minute, for example.

Upon detecting a second identity change event, the mobile device 1 selects a third identity profile with the identifier ID-A2 from the stored identity profiles and marks the used identity profile with the identifier ID-B1 as unusable in field 61. In step 221, the mobile device 1 transmits further authentication information to the base station 21 of the mobile communication network, see also step 113 of FIG. 5. The further authentication information comprises the identifier ID-A2. In step 223, the base station 21 transmits a response to the mobile device 1 confirming that the mobile device 1 has been authenticated.

Steps 231 and 233 are performed upon determining that a quantity of usable identity profiles in the storage means is smaller than a predefined threshold. Steps 231 and 233 are similar to steps 201 and 203, except that the mobile device 1 further identifies the already used identity profiles with identifiers ID-A1 and ID-B1 and indicates that the mobile device 1 has finished using them. After step 231, at moment 55, the profile server system 11 marks the identified identity profiles (with identifiers ID-A1 and ID-B1) as not being in use (by clearing the flag in field 73) and associates them with a last-used time 75 ("03/05" in the example of FIG. 7). This last-used time may be indicated in the request received from the mobile device or alternatively, the profile server system 11 may take the reception time of the request as last-used time, for example.

At moment 55, the profile server system 11 further retrieves two new identity profiles with identifiers ID-A3 and ID-B3 from the storage means of the profile server system and marks them as in use. The profile server system 11 makes sure that the retrieved identity profiles either have no last-used time associated with them or have a last-used time associated with them whose difference with the current time exceeds a predetermined threshold (i.e. cooldown time).

In step 233, the profile server system 11 transmits the two retrieved identity profiles to the mobile device 1, see also steps 123 and 101 of FIG. 5. The mobile device 1 then stores these two identity profiles in the storage means of the mobile device at moment 56, replacing the already used identity profiles with identifiers ID-A1 and ID-B1.

Between steps 207 and 211, the mobile device 1 uses the mobile communication network and between steps 213 and 221, the mobile device 1 uses the further mobile communication network. In the example of FIG. 7, only four identity profiles are shown stored on the storage means of the mobile device and only eight identity profiles are shown stored on the storage means of the profile server system. Typically, more identity profiles are stored on these storage means, but less identity profiles are shown to keep the illustration simple.

In the example of FIG. 7, each identity profile comprises a field 73 for indicating whether the identifier 71 is in use and a field 75 for indicating when the identifier was last used. In an alternative embodiment, each identity profile is instead associated with a cooldown timer and may have, for example, one of three statuses: "free for allocation" (only identity profiles with this status are retrieved), "allocated to device" (i.e. in use) and "cooling down" (just deallocated and returned).

Figure 8:
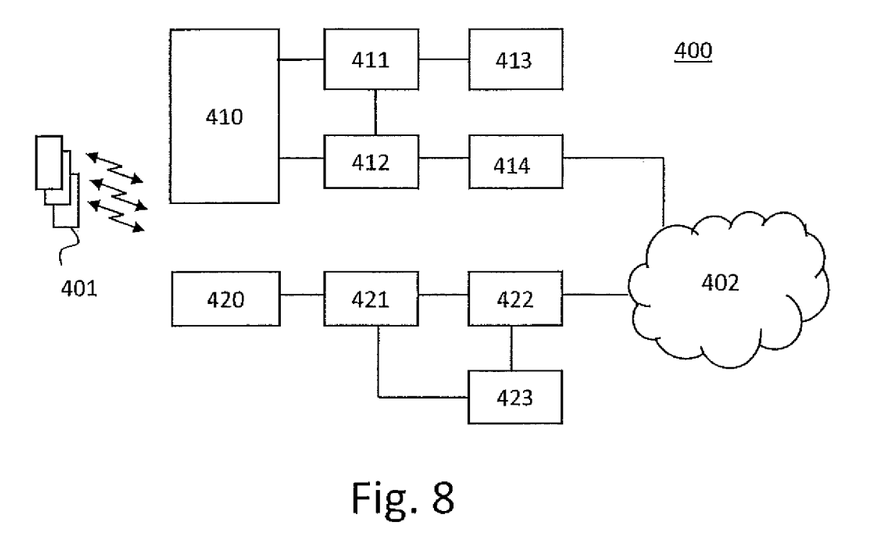
FIG. 8 is a block diagram of an exemplary cellular telecommunication system used in an embodiment of the device and the system of the invention.

In the telecommunications system 400 of FIG. 8, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 8 represents a GSM/GPRS or UMTS network.

For a GSM/GPRS network, a radio access network (RAN) system 420 comprises a plurality of nodes, including base stations (combination of a BSC and a BTS), not shown individually in FIG. 8. The core network system comprises a Gateway GPRS Support Node 422 (GGSN), a Serving GPRS Support Node 421 (SGSN, for GPRS) or Mobile Switching Centre (MSC, for GSM, not shown in FIG. 8) and a Home Location Register 423 (HLR). The HLR 423 contains subscription information for user devices 401, e.g. mobile stations MS.

For a UMTS radio access network (UTRAN), the radio access network system 420 also comprises a Radio Network Controller (RNC) connected to a plurality of base stations (NodeBs), also not shown individually in FIG. 8. In the core network system, the GGSN 422 and the SGSN 421/MSC are connected to the HLR 423 that contains subscription information of the user devices 401, e.g. user equipment UE.

The upper branch of the telecommunications system in FIG. 8 represents a 4G network, commonly indicated as Long Term Evolution (LTE) system or Evolved Packet System (EPS).

The radio access network system 410 (E-UTRAN) of the EPS, comprises base stations (evolved NodeBs, eNodeBs or eNBs), not shown individually in FIG. 8, providing cellular wireless access for a user device 401, e.g. user equipment UE. The core network system comprises a PDN Gateway (P-GW) 414 and a Serving Gateway 412 (S-GW). The E-UTRAN 410 of the EPS is connected to the S-GW 412 via a packet network. The S-GW 412 is connected to a Home Subscriber Server HSS 413 and a Mobility Management Entity MME 411 for signalling purposes. The HSS 413 includes a Subscription Profile Repository SPR for user devices 401.

For GPRS, UMTS and LTE systems, the core network system is generally connected to a further packet network 402, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 9:
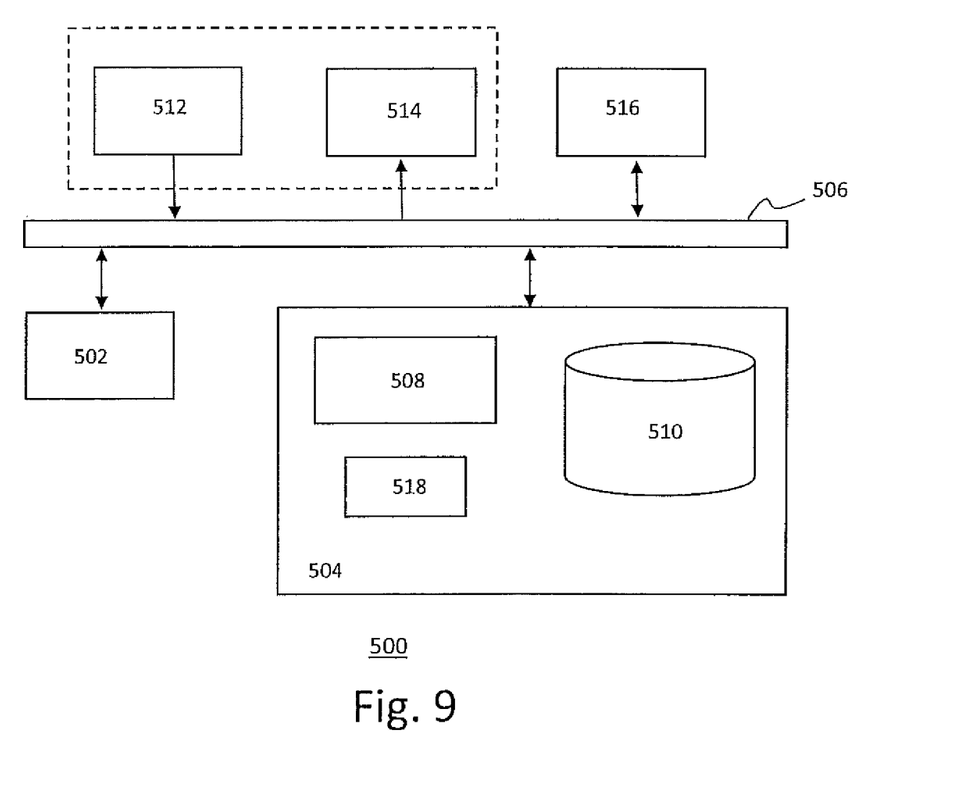
FIG. 9 is a block diagram of an exemplary data processing system for performing the methods of the invention.

FIG. 9 depicts a block diagram illustrating an exemplary data processing system that may perform the methods as described with reference to FIGS. 4 and 5.

As shown in FIG. 9, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that is capable of performing the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the number of times program code must be retrieved from the bulk storage device 510 during execution.

Input/output (I/O) devices depicted as an input device 512 and an output device 514 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 500.

As pictured in FIG. 9, the memory elements 504 may store an application 518. In various embodiments, the application 518 may be stored in the local memory 508, he one or more bulk storage devices 510, or separate from the local memory and the bulk storage devices. It should be appreciated that the data processing system 500 may further execute an operating system (not shown in FIG. 9) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 502 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A server system, comprising:
   at least one receiver;
   at least one transmitter;
   storage means for storing a collection of identity profiles; and
   at least one processor configured to:
      retrieve a plurality of said collection of identity profiles from said storage means, each of said plurality of identity profiles comprising an identifier of a user of a mobile communication network and/or a unique device identifier and each of said plurality of identity profiles not being marked, in said storage means, as in use,
      use said at least one transmitter to transmit said plurality of identity profiles to a mobile device,
      mark, in said storage means, said plurality of identity profiles as in use,
      use said at least one receiver to receive a message from said mobile device, said message identifying at least one of said plurality of identity profiles, and
      mark, in said storage means, said at least one identity profile identified in said message as not being in use,
   wherein said at least one processor is configured to associate, in said storage means, a last-used time with said at least one identity profile identified in said message upon receiving said message,
   one or more of said plurality of identity profiles are associated with a last-used time, and
   a difference between a current time when said one or more identity profiles are retrieved and each of said one or more last-used times exceeds a predetermined threshold.

2. The server system as claimed in claim 1, wherein said identifier of said user of said mobile communication network comprises an International Mobile Subscriber Identity.

3. The server system as claimed in claim 1, wherein said unique device identifier comprises an International Mobile Equipment Identity.

4. The server system as claimed in claim 2, wherein said unique device identifier comprises an International Mobile Equipment Identity.

5. The server system as claimed in claim 1, wherein said identifier of said user of said mobile communication network comprises an International Mobile Subscriber Identity.

6. The server system as claimed in claim 1, wherein said unique device identifier comprises an International Mobile Equipment Identity.

7. The server system as claimed in claim 5, wherein said unique device identifier comprises an International Mobile Equipment Identity.

8. A computer-implemented method of enabling selection of an identity profile, comprising:
   retrieving a plurality of said collection of identity profiles from a storage means, each of said plurality of identity profiles comprising an identifier of a user of a mobile communication network and/or a unique device identifier and each of said plurality of identity profiles not being marked, in said storage means, as in use;
   transmitting said plurality of identity profiles to a mobile device;
   marking, in said storage means, said plurality of identity profiles as in use;
   receiving a message from said mobile device, said message identifying at least one of said plurality of identity profiles; and
   marking, in said storage means, said at least one identity profile identified in said message as not being in use,
   wherein said at least one processor is configured to associate, in said storage means, a last-used time with said at least one identity profile identified in said message upon receiving said message,
   one or more of said plurality of identity profiles are associated with a last-used time, and
   a difference between a current time when said one or more identity profiles are retrieved and each of said one or more last-used times exceeds a predetermined threshold.

9. A non-transitory computer readable medium having a computer program or suite of computer programs stored thereon, said computer program or suite of computer programs comprising at least one software code portion which, when run on a computer system, being configured for performs the method of claim 8.

* * * * *